United States Patent Office 3,492,139
Patented Jan. 27, 1970

3,492,139
PHOSPHATE GEL COMPOSITIONS
James P. Hamilton, Pasadena, Md., assignor to FMC Corporation, New York, N.Y., a corporation of Delaware
No Drawing. Filed May 17, 1968, Ser. No. 729,919
Int. Cl. C09k 3/22
U.S. Cl. 106—287                                2 Claims

ABSTRACT OF THE DISCLOSURE

Triorganic phospate coating compositions suitable for coating the strands or fibers of air filters, comprising 100 parts by weight of a liquid phosphate ester selected from the group consisting of alkyl diaryl phosphates, and triaryl phosphates, 1–4 parts by weight of substantially pure pyrogenic silica having a particle size no greater than 0.025 micron, and 0.1 to 2 parts by weight of a gelling agent selected from the group consisting of tributoxyethyl phosphate, triethoxyethyl phosphate, and triethoxyethoxyethyl phosphate.

BACKGROUND OF THE INVENTION

Field of the invention

This invention relates to novel, bodied, thixotropic triorganic phosphate gel compositions suitable for coating filter media in air filters.

Description of the prior art

Viscous-impingement type industrial air filters contain porous filter media, or mats, through which air is passed. The filter medium is coated with a stable, non-volatile liquid triorgano phosphate which entraps dust particles as air is passed through the filter and prevents the dust particles from becoming reentrained in the air stream. However, loss of this liquid coating during use results in a lowering of the air cleaning capacity of the filter. The liquid may be blown off the filter media by high air velocities, encountered for example, with diesel engine filters. Moreover, when a filter medium is tightly wound around spools, as in the recently developed automatic replacement filters, the liquid tends to be squeezed out of the filter media.

In the past, these loses have been reduced by bodying the liquid with a semi-soluble resin or other gelling agent. However, these resin-liquid compositions tend to decrease in viscosity at elevated temperatures, especially at the temperatures reached with diesel engine filters. If gelling agents, such as finely divided silica are used, as much as 7% or more, based on the mixture, is ordinarily required for satisfactorily thickening a suitable liquid such as a triorganic phosphate. This amount of silica in the liquid can clog spray nozzles and associated filters generally used in coating the mats. Furthermore, the mixture becomes thicker upon aging due to syneresis resulting in the reduction of the ability to entrap dust particles. Syneresis may also occur during storage causing the liquid to separate from the gel structure. The separated triorganic phosphate will then drain out of the mat leaving a higher concentraiton of gel solids on the surface of the mat. The over-all effect is a loss in dust filtering capacity.

Excellent triorgano-phosphate gels at lower silica levels for use on viscous-impingement type air filters can be prepared by using surfactants with low levels of silica, as described in U.S. Patent 3,297,460.

SUMMARY OF THE INVENTION

We have now discovered improved coating compositions for viscous-impingement air filters which comprise: (a) 100 parts by weight of a triorganic phosphate of the formula

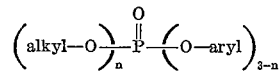

in which n is 0–1, the alkyl radical is of 1–10 carbon atoms and the aryl radical is a mixture of phenols and alkyl phenols, such as are derived from tar acids; (b) 1–4 parts by weight of substantially pure pyrogenic silica having a particle size of not greater than 0.025 microns and (c) 0.1 to 2 parts by weight of a trialkoxy alkyl phosphate selected from the group consisting of tri(butoxyethyl) phosphate, tri(ethoxyethyl) phosphate and tri(ethoxyethoxyethyl) phosphate.

The pyrogenic silica alone at the levels of 1 to 4 parts per hundred parts of liquid triorganic phosphate does not thicken the triorganic phosphate sufficiently to form a satisfactory coating composition. Surprisingly, very small amounts of selected trialkoxy alkyl organic phosphate compositions containing not more than 6 carbon atoms total in the alkoxy alkyl group cause large increases in viscosity and are useful as coatings for air filter media. These thickened triorganic phosphate compositions do not drain from the filter at room temperature and maintain a sufficiently high viscosity at elevated temperatures to be useful in most air filter applications. Quite surprisingly, air filter media coated with the triorganic phosphate silica compositions of this invention have unexpectedly low syneresis losses and very good high temperature stability; this is surprising since the pyrogenic silica alone with triorganic phosphates containing primarily aryl radicals are not thickened appreciably by the use of pyrogenic silica.

DESCRIPTION OF THE INVENTION AND THE PREFERRED EMBODIMENTS

The triorganic phosphates which are useful in accordance with this invention are those liquid phosphate esters having the formula:

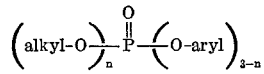

in which "n" is 0 to 1, the alkyl radical is 1–10 carbon atoms and the aryl radical is a mixture of phenols and alkyl phenols, such as are derived form tar acid. The term "tar acid" is intended to include those acids which can be extracted with dilute caustic soda from tars, such as coal tar, common wood tar, petroleum tar and lignite tar. The crude tar extracts usually contain phenol, ortho-cresol, meta-cresol, para-cresol and isomeric xylenols, and they can be fractionated to give various grades of these products. These liquid phosphate esters are widely used as plasticizers for vinyl chloride homopolymers and copolymers and are well known to those skilled in the art. Triorganic phosphates of particular use in practicing this invention are termed tricresyl phosphates. The term "tricresyl phosphate" is intended to include esters made from phosphorus oxychloride and mixtures of alkylphenols known as "cresylic acids" which may be derived from coal tar, wood tar or petroleum distillate. Suitable alkyl radicals include methyl, ethyl, propyl, iso-propyl, butyl, amyl, isohexyl and ethylhexyl, as well as others well known in the art. The aryl groups in these esters can contain from 6 to 20 carbon atoms and in the triaryl phosphates and the alkyl diaryl phosphates the aryl groups can be the same or different aryl groups, though preferably they are the same aryl groups and contain from 6 to 12 carbon atoms.

The silica used in preparing the high viscosity compositions of this invention is of that type known as "pyrogenic silica." This type of silica is prepared by reacting almost pure silicon tetrachloride and water in a vapor phase to produce silicon dioxide and hydrogen chloride. The silica so produced is a very pure powder, of the order of 99% pure, having a particle size not greater than about 0.025 micron. Pyrogenic silica having particle sizes as small as about 0.007 micron is presently available and useful in practicing this invention. Preferably, the pyrogenic silica has a particle size of about 0.015 to 0.020 micron.

The trialkoxy alkyl phosphates which are useful in practicing this invention are those selected from the group consisting of tri(butoxyethyl) phosphate, tri(ethoxyethyl) phosphate and tri(ethoxyethoxyethyl) phosphate. The term "tri(alkoxy alkyl) phosphate" is intended to include esters made from phosphorus oxychloride and alkoxy alkyl alcohols and alkoxyalkoxy alkyl alcohols, containing no more than 6 carbon atoms.

The coating compositions of this invention were prepared by simply dispersing the pyrogenic silica gelling agent into mixtures of the triaryl phosphate or the alkyl diaryl phosphate and the trialkoxy alkyl phosphate in a high speed laboratory blender for a short period of time, sometimes as short as one and one-half minutes. As far as is known any method of dispersing solids in liquids to produce coating compositions of this type may be used in practicing this invention.

The following examples illustrating the novel filter media coating compositions of this invention are presented with no intent that the invention be limited thereto. All parts and percentages are by weight. For comparison the ungelled tricresyl phosphates used in the examples had the following viscosities at room temperature (20° C.). Cresyl diphenyl phosphate, 60–70 centipoises; Tricresyl phosphate, 120 centipoises; Mixed cresyl xylyl phosphate, 220–300 centipoises; Trixylyl phosphate, 250–325 centipoises.

EXAMPLE 1

A series of gels were prepared by stirring together different ratios of cresyl diphenyl phosphate, tris(2-butoxyethyl) phosphate and pyrogenic silica for a short period of time using a high speed mixer. A comparative example was run which did not contain any tris(2-butoxyethyl) phosphate. The compositions of the formulations and test data obtained are listed in Table 1. Viscosities were determined using a Brookfield Model LVF Viscometer with a No. 4 spindle at 6 and 60 r.p.m. Syneresis losses were determined by placing a weighed amount of gel in an uncoated paper cup and measuring the weight loss after varying periods of time.

TABLE 1.—EFFECT OF TRIS (2-BUTOXYETHYL) PHOSPHATE IN CRESYL DIPHENYL PHOSPHATE-PYROGENIC SILICA DISPERSIONS

| | Comparison Example | 1 | 2 | 3 | 4 | 5 | 6 | 7 | 8 |
|---|---|---|---|---|---|---|---|---|---|
| Cresyl diphenyl phosphate | 100 | 100 | 100 | 100 | 100 | 100 | 100 | 100 | 100 |
| Pyrogenic silica | 3 | 3 | 3 | 3 | 4 | 4 | 4 | 4 | 4 |
| Tris (2-butoxyethyl) phosphate | 0 | 1 | 2 | 3 | 0 | 0.5 | 1 | 2 | 3 |
| Viscosity (cps.) (Brookfield LVF, #4 spindle): | | | | | | | | | |
| 6 r.p.m | 1,000 | 1,000 | 1,000 | 900 | 1,100 | 3,000 | 5,500 | 4,400 | 2,000 |
| 60 r.p.m | 350 | 360 | 380 | 350 | 480 | 950 | 1,200 | 1,050 | 710 |

Note.—Syneresis loss after one week (percent)—Example 5: 4.4=.

EXAMPLE 2

A second series of samples were prepared and tested according to the procedure outlined in Example 1, except that tricresyl phosphate was used in place of the cresyl diphenyl phosphate of Example 1. The composition details and the viscosity characteristics of the various mixtures of tricresyl phosphate, tris(2-butoxyethyl) phosphate and pyrogenic silica are found in Table 2.

TABLE 2.—EFFECT OF TRIS(2-BUTOXYETHYL) PHOSPHATE IN TRICRESYL PHOSPHATE-PYROGENIC SILICA DISPERSIONS

| | Comparison Example | 9 | 10 | 11 | Comparison Example | 12 | 13 | 14 | Comparison Example | 15 | 16 | 17 | 18 |
|---|---|---|---|---|---|---|---|---|---|---|---|---|---|
| Tricresyl phosphate | 100 | 100 | 100 | 100 | 100 | 100 | 100 | 100 | 100 | 100 | 100 | 100 | 100 |
| Pyrogenic silica | 2.0 | 2 | 2 | 2 | 3 | 3 | 3 | 3 | 4 | 4 | 4 | 4 | 4 |
| Tris(2-butoxyethyl) phosphate | 0 | 1 | 2 | 3 | 0 | 1 | 2 | 3 | 0 | 0.5 | 1 | 2 | 3 |
| Viscosity (cps.) (Brookfield LVF, #4 spindle): | | | | | | | | | | | | | |
| 6 r.p.m | 500 | 500 | 500 | 500 | 1,000 | 1,000 | 1,000 | 900 | 1,200 | 4,000 | 8,000 | 3,000 | 1,000 |
| 60 r.p.m | 250 | 200 | 200 | 200 | 360 | 500 | 500 | 370 | 550 | 1,350 | 1,800 | 800 | 460 |

EXAMPLE 3

A series of samples were prepared and tested according to the procedure of Example 1, in which the cresyl diphenyl phosphate of Example 1 was replaced by mixed cresyl xylyl phosphate. The composition details and the viscosity characteristics of the various mixtures of mixed cresyl xylyl phosphate, tris(2-butoxyethyl) phosphate and pyrogenic silica are found in Table 3.

TABLE 3.—EFFECT OF TRIS(2-BUTOXYETHYL)PHOSPHATE IN CRESYLXYLYL PHOSPHATE-PYROGENIC SILICA DISPERSIONS

|  | Comparison Example | 19 | 20 | 21 | 22 | 23 | 24 | 25 | 26 |
|---|---|---|---|---|---|---|---|---|---|
| Mixed cresyl dixylyl phosphate | 100 | 100 | 100 | 100 | 100 | 100 | 100 | 100 | 100 |
| Pyrogenic silica | 2 | 2 | 2 | 2 | 2.5 | 2.5 | 2.5 | 2.5 | 2.5 |
| Tris(2-butoxyethyl)phosphate | 0 | 0.25 | 0.5 | 1.0 | 0.125 | 0.25 | 0.375 | 0.5 | 1.0 |
| Viscosity (cps.) (Brookfield LVF, #4 spindle): |  |  |  |  |  |  |  |  |  |
| 6 r.p.m | 400 | 820 | 600 | 600 | 2,900 | 2,300 | 2,500 | 1,700 | 700 |
| 60 r.p.m | 330 | 530 | 480 | 400 | 970 | 890 | 910 | 820 | 540 |

|  | Comparison Example | 27 | 28 | 29 | 30 | 31 | Comparison Example | 32 | 33 |
|---|---|---|---|---|---|---|---|---|---|
| Mixed cresyl dixylyl phosphate | 100 | 100 | 100 | 100 | 100 | 100 | 100 | 100 | 100 |
| Pyrogenic silica | 3 | 3 | 3 | 3 | 3 | 3 | 4 | 4 | 4 |
| Tris(2-butoxyethyl)phosphate | 10 | 0.375 | 0.5 | 0.75 | 1.0 | 2.0 | 0 | 0.5 | 0.75 |
| Viscosity (cps.) (Brookfield LVF, #4 spindle): |  |  |  |  |  |  |  |  |  |
| 6 r.p.m | 420 | 5,100 | 5,300 | 2,000 | 1,500 | 600 | 500 | 17,500 | 10,000 |
| 60 r.p.m | 350 | 1,340 | 1,410 | 1,120 | 840 | 426 | 420 | 4,000 | 2,950 |

|  | 34 | 35 | 36 | 37 | 38 | Comparison Example | 39 |
|---|---|---|---|---|---|---|---|
| Mixed cresyl dixylyl phosphate | 100 | 100 | 100 | 100 | 100 | 100 | 100 |
| Pyrogenic silica | 4 | 4 | 4 | 4 | 4 | 5 | 5 |
| Tris(2-butoxyethyl)phosphate | 1.0 | 1.25 | 2.0 | 3.0 | 4.0 | 0 | 2 |
| Viscosity (cps.) (Brookfield LVF, #4 spindle): |  |  |  |  |  |  |  |
| 6 r.p.m | 9,400 | 5,200 | 1,200 | 680 | 680 | 580 | 3,200 |
| 60 r.p.m | 2,100 | 1,870 | 870 | 500 | 470 | 500 | 1,320 |

Note.—Syneresis loss after one week (percent):
Example 33: 1.2%.
Example 32: 2.1%.
Viscosity at T° C.—Example 30:
25°–1,500  55°–1,000  75°–2,000
35°–1,100  65°–  900  80°–3,800
45°–1,000  70°–  130  85°–4,700

EXAMPLE 4

A series of samples were prepared and tested according to the procedure of Example 1, except the cresyl diphenyl phosphate of Example 1 was replaced with trixylyl phosphate. The composition details and the viscosity characteristics of the various mixtures of trixylyl phosphate, tris(2-butoxyethyl) phosphate and pyrogenic silica are found in Table 4.

TABLE 4.—EFFECT OF TRIS(2-BUTOXYETHYL)PHOSPHATE IN TRIXYLYL PHOSPHATE-PYROGENIC SILICA DISPERSIONS

|  | Comparison Example | 40 | 41 | 42 | 43 |
|---|---|---|---|---|---|
| Trixylylphosphate | 100 | 100 | 100 | 100 | 100 |
| Pyrogenic silica | 2.5 | 2.5 | 2.5 | 4.0 | 4.0 |
| Tris(2-butoxyethyl)phosphate | 0 | 0.5 | 1.0 | 0.5 | 1.0 |
| Viscosity (cps.) (Brookfield LVF, #4 spindle): |  |  |  |  |  |
| 6 r.p.m | 900 | 4,200 | 2,000 | 19,000 | 12,000 |
| 60 r.p.m | 810 | 1,750 | 1,200 | 4,940 | 3,600 |

EXAMPLE 5

A series of samples were prepared and tested according to the procedure of Example 1, except the tris(2-butoxyethyl) phosphate of Example 1 was replaced with other tri(alkoxy alkyl) phosphates. The composition details and the viscosity characteristics of the various mixtures of mixed cresyl-xylyl phosphate and the selected tri(alkoxy alkyl) phosphate are found in Table 5.

TABLE 5.—EFFECT OF TRIS(ALKOXY ALKYL)PHOSPHATE IN MIXED CRESYL XYLYL PHOSPHATE-PYROGENIC SILICA DISPERSIONS

|  | Comparison Example | 5–1 | 5–2 | 5–3 |
|---|---|---|---|---|
| Mixed cresyl xylyl phosphate | 100 | 100 | 100 | 100 |
| Pyrogenic silica | 4 | 4 | 4 | 4 |
| Tris(2-butoxyethyl)phosphate |  | .5 |  |  |
| Tris(ethoxyethyl)phosphate |  |  | .25 |  |
| Tris(ethoxyethoxyethyl)phosphate |  |  |  | .25 |
| Viscosity (cps.) (Brookfield LVF, #4 spindle): |  |  |  |  |
| 60 r.p.m | 400 | 4,000 | 8,000 | 8,000 |
| 6 r.p.m | 1,000 | 17,500 | 50,000 | 50,000 |

As will be apparent to those skilled in the art, numerous modifications and variations of the embodiments illustrated above may be made without departing from the spirit of the invention or the scope of the following claims.

What is claimed is:

1. An organo phosphorous composition for viscous-impingement air filters which comprises: (a) 100 parts by weight of a triorganic phosphate of the formula

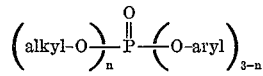

in which $n$ is 0–1, the alkyl radical is 1–10 carbon atoms and the aryl radical is derived from a mixture of phenols and alkyl phenols containing 6 to 20 carbon atoms; (b) 1 to 4 parts by weight of a substantially pure pyrogenic silica having a particle size not greater than 0.025 microns; and (c) 0.1 to 2 parts by weight of a trialkoxy alkyl phosphate selected from the group consisting of tri(butoxyethyl) phosphate, tri(ethoxyethyl) phosphate, and tri(ethoxyethoxyethyl) phosphate.

2. The coating composition of claim 1 in which the triorganic phosphate is selected from the group consisting of tricresyl phosphate, cresyl diphenyl phosphate, mixed cresyl xylyl phosphate and trixylyl phosphate and the pyrogenic silica has a particle size of 0.01 to 0.020 microns.

References Cited

UNITED STATES PATENTS 3,133,884   5/1964   Graham _____ 252—88

JULIUS FROME, Primary Examiner
T. MORRIS, Assistant Examiner

U.S. Cl. X.R.

252—88